(No Model.)
P. C. LEWIS.
Combined Syringe and Force Pump.
No. 230,639. Patented Aug. 3, 1880.
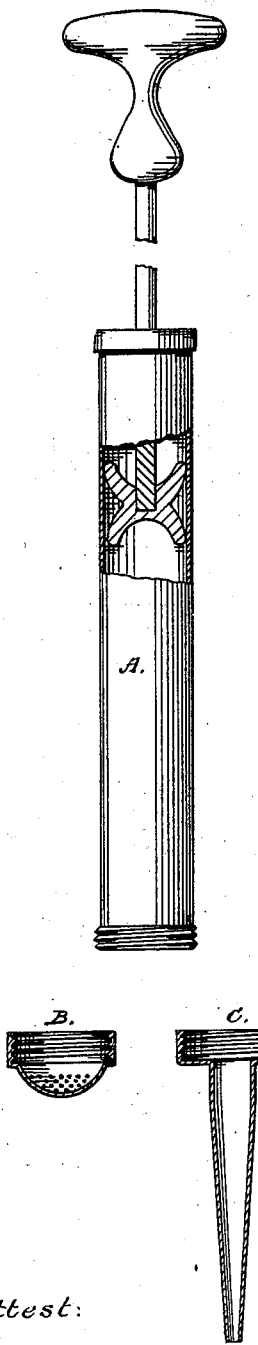
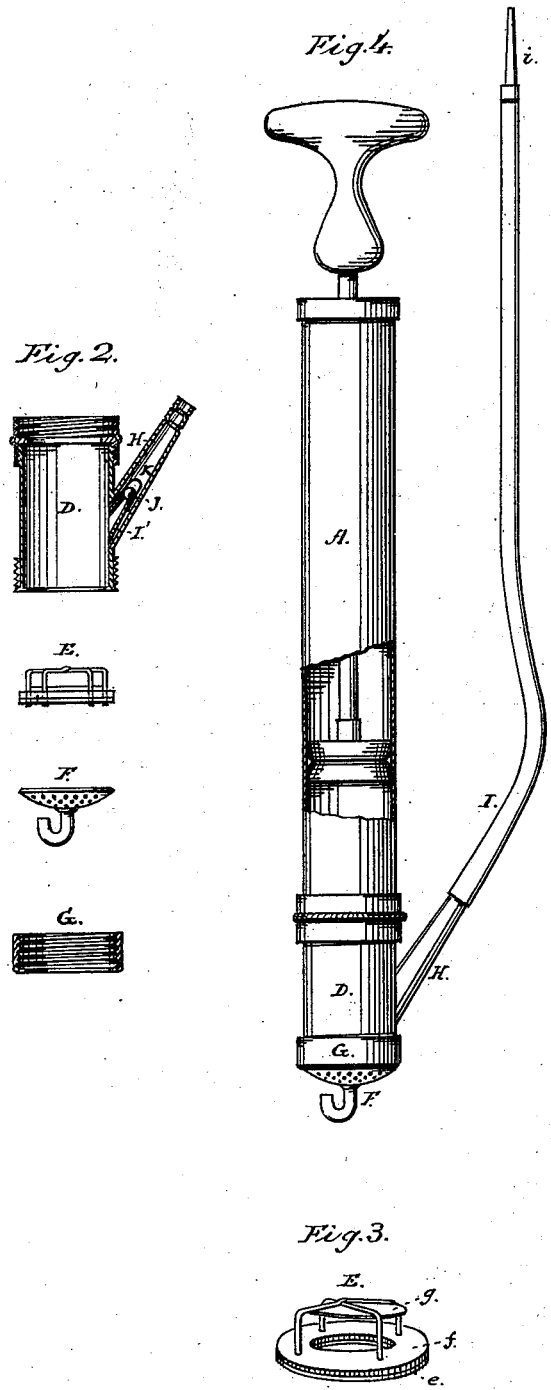
Attest:
F. W. Howard
D. P. Cool
Inventor:
Pearl C. Lewis
by
Geo. A. Sawyer

UNITED STATES PATENT OFFICE.

PEARL C. LEWIS, OF CATSKILL, NEW YORK.

COMBINED SYRINGE AND FORCE-PUMP.

SPECIFICATION forming part of Letters Patent No. 230,639, dated August 3, 1880.

Application filed June 12, 1880. (No model.)

*To all whom it may concern:*

Be it known that I, PEARL CLINTON LEWIS, of Catskill, in the county of Greene and State of New York, have invented certain new and useful Improvements in Combined Syringe and Force-Pump; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

The object of this invention is to combine in a single implement three very valuable and useful tools—an agricultural syringe, an injector, and a force-pump; and it consists, essentially, in adding to the agricultural syringe secured to me by Letters Patent of March 11, 1879, No. 213,050, an attachment containing the necessary valves, and provided with a tube fitted with a hose and nozzle to convert said syringe into a force-pump.

Parties already provided with my agricultural syringe have only to get this attachment and they treble the value and usefulness of the implement at small cost.

In the drawings, Figure 1 represents the agricultural syringe, to which may be attached the rose B or nozzle C, as occasion may require. Fig. 2 shows the attachment D, by means of which the syringe A is converted into the force-pump, as shown at Fig. 4. Fig. 3 shows an enlarged perspective view of the valve E.

The syringe, Fig. 1, with its piston, rose, and nozzle, has been fully described in my Patent No. 213,050, and I will not now refer to it further than to say that, finding in practice that the rubber-cupped piston was liable to stick too tightly to the cylinder, I now coat the wearing-surface of the rubber with cloth, which overcomes that tendency and causes the piston to move with less friction.

In Fig. 2 the attachment cylinder is provided at its upper end with a coupling, by which it may be screwed to the end of the syringe-cylinder A. At its lower end there is a valve, E, a convex perforated strainer, F, provided with a hook, by which the pump may be fastened to the water-receptacle, and a screw-cap, G, within which is placed the valve and strainer, and by which they are both secured to the pump.

The conical tube H is formed on its end with two or three annular grooves for the purpose of more effectually holding thereon the hose I. Within this tube is a smaller tube provided with a marble valve, J, confined thereon by a bent wire, K. These two tubes are soldered to the cylinder D water-tight.

The valve E, Fig. 3, consists of a plate, $e$, a leather washer, $f$, the valve $g$, and the wires for confining the valve to its seat. The leather washer serves the double purpose of a packing for the cap G and a seat for the valve $g$.

For use as an agricultural syringe, to throw medicated water on vines, to destroy potato-bugs, &c., the rubber piston, as shown in Fig. 1, is used, this piston having considerable friction and holding the water well while the operator walks between the rows of plants. For a force-pump, however, the leather piston (shown at Fig. 4) is better, as it works more easily.

The hook F in the perforated staple-plate should be squared on the end passing through the plate and firmly riveted down to prevent its turning. A staple fastened to a plate in the bottom of a bucket or vessel containing the water holds the pump down to its work against the upward pull of the piston. The hose I is provided with a nozzle, $i$.

The uses of this device are obvious. As a syringe, potato-bug exterminator, &c., the rose B is screwed to the cylinder A. As an injector or small portable force-pump the nozzle C is used—in both instances with the rubber piston of Fig. 1. As a force-pump, detach the rose or nozzle and substitute the cylinder D, to which the valves, hook, and hose are already fixed, and put in the leather piston, and thus in a moment a very efficient force-pump is provided at but small additional expense.

Having thus described my invention, what I claim as new, and desire to secure by Letters Patent, is—

1. The syringe attachment D, provided with suitable valves for the ingress and egress of water, and with the tube H, adapted to receive a hose, substantially as and for the purposes described.

2. The combination of the syringe A with the force-pump attachment D, containing the valves E and J, and provided with the hose-tube H, substantially as described.

3. The combination of the syringe A with the force-pump attachment D, provided with valves E and J and the hook-plate F, substantially as described.

In testimony that I claim the foregoing as my own I affix my signature in presence of two witnesses.

PEARL CLINTON LEWIS.

Witnesses:
EUGENE RAYMOND,
G. H. JONES.